United States Patent
Lo et al.

(10) Patent No.: US 7,415,114 B2
(45) Date of Patent: Aug. 19, 2008

(54) QUANTUM KEY SYSTEM AND METHOD

(75) Inventors: Hoi Kwong Lo, Toronto (CA); Daniel Gottesman, Waterloo (CA)

(73) Assignee: MagiQ Technologies, Inc., New York, NY (US)

( * ) Notice: Subject to any disclaimer, the term of this patent is extended or adjusted under 35 U.S.C. 154(b) by 981 days.

(21) Appl. No.: 10/472,836

(22) PCT Filed: Apr. 30, 2002

(86) PCT No.: PCT/US02/11862

§ 371 (c)(1), (2), (4) Date: Mar. 1, 2004

(87) PCT Pub. No.: WO02/089396

PCT Pub. Date: Nov. 7, 2002

(65) Prior Publication Data
US 2004/0141618 A1     Jul. 22, 2004

Related U.S. Application Data

(60) Provisional application No. 60/287,852, filed on May 1, 2001.

(51) Int. Cl.
*H04L 9/00* (2006.01)
(52) U.S. Cl. .......................... 380/283; 380/44; 380/256
(58) Field of Classification Search .................. 380/283, 380/278, 256, 277
See application file for complete search history.

(56) References Cited

U.S. PATENT DOCUMENTS

| | | | |
|---|---|---|---|
| 5,307,410 A | | 4/1994 | Bennett |
| 5,764,765 A | * | 6/1998 | Phoenix et al. ............. 380/283 |
| 6,188,768 B1 | | 2/2001 | Bethune |
| 6,272,224 B1 | * | 8/2001 | Mazourenko et al. ....... 380/283 |
| 6,678,379 B1 | * | 1/2004 | Mayers et al. .............. 380/278 |
| 7,181,011 B2 | * | 2/2007 | Trifonov ..................... 380/256 |
| 7,346,166 B2 | * | 3/2008 | Inoue et al. ................. 380/263 |

OTHER PUBLICATIONS

Shor et al, "Simple proof of security of 3884 Quantun Key distribution Protocol," Phys rev lett 85 (2000) 441-444 (May 12, 2000).
Inamori, "Security of EPX based Quantum Key distribution using three bases," arxiv: quant-ph/000 80 76 VI Aug. 16, 2000.

(Continued)

*Primary Examiner*—Gilberto Barron, Jr.
*Assistant Examiner*—Samson B Lemma
(74) *Attorney, Agent, or Firm*—Opticus IP Law PLLC

(57) ABSTRACT

This invention provides a quantum key distribution (QKD) system and method for determining initial quantum keys (QKs), including an initial QKA (220) and an initial QKB (230), determining an initial QKA value of a first function applied to said initial QKA, wherein a value of said first function depends upon values of specified information unit of a QK, including bit i (210), determining an initial QKB value of said first function applied to said initial QKB; and forming a revised QKA by depending a value of an information unit of said revised QKA on a value of information unit i of said initial QKA, if said initial QKA value equals said initial QKB value.

30 Claims, 3 Drawing Sheets

| 210 Bit = | 1 | 2 | 3 | 4 | 5 | 6 | 7 | 8 | 9 | 10 | ... |
|---|---|---|---|---|---|---|---|---|---|---|---|
| 220 ALICE (QKA) | 1 | 0 | 0 | 1 | 0 | 1 | 1 | 1 | 0 | 0 | ... |
| 230 BOB (QKB) | 1 | 0 | 1 | 1 | 0 | 1 | 1 | 0 | 0 | 0 | ... |
| 240 "EVE" | ? | ? | 0 | 1 | ? | ? | ? | 1 | ? | ? | ... |

200

OTHER PUBLICATIONS

Bennet et al., "Mixed State entanglement and quantum error correcton," phy rev. A vol. 54, No. 5 Nov. 1996.

Bennet et al, "Experimental quantum cryptography" Eurocrypt '90 pp. 253-265 1991.

Bru B, "Optimal eavesdropping in quantum cryptography with Six States," Phy rev. lett vol. 81, No. 14, Oct. 5, 1998. (3018-3020).

Bennet et al, "Quantum cryptography: Public Key distribution and coin tossing," In'tl conf. on computers systems and Signal Proc, Bangalore, India Dec. 10-12, 1984.

* cited by examiner

QUANTUM KEY SYSTEM AND METHOD

CROSS-REFERENCE TO RELATED APPLICATIONS

This application claims priority under 35 USC 119(e) to U.S. provisional application 60/287,852, filed May 1, 2001, entitled "Method and system for secure quantum key distribution using two-way classical communications." The teachings of that application are incorporated herein by reference.

BACKGROUND OF THE INVENTION

1. Field of the Invention
This invention relates to the field of cryptography.
2. Discussion of the Background
U.S. Pat. No. 5,307,410 to Bennett discloses a system for transmitting a cryptographic key information between two entities. The teachings of that patent are incorporated herein by reference.

U.S. Pat. No. 6,188,768 to Bethune et al. discloses another system for transmitting a cryptographic key information between two entities. The teachings of that patent are incorporated herein by reference.

F. J. MacWilliams and N. J. A. Sloane, "The Theory of Error-correcting codes," North-Holland, 1977, and D. Gottesman's Ph.D. thesis, pp. 8-10, available at the URL: http://xxx.lanl.gov/abs/quant-ph/9705052 discuss classical coding theory. The teachings of these publications are incorporated herein by reference.

A qubit is a mathematical representation of the wave function of a two level quantum mechanical system.

A Quantum Key (QK) is a series of digital values (or more generally a series of values in an arbitrary base) derived from transmission of information in a Quantum Key Distribution (QKD) system.

QKD means the transmission of information from a sender to a receiver via a signal strength low enough so that quantum mechanical effects are significant wherein the information encodes a QK. In particular, QKD refers to the transmission of information in which a statistical error rate in reception of a series of transmitting datum is significantly effected by any measurement of the transmission between the sender and the receiver.

A QKD system is a system providing the means for QKD.

An autocompensating QKD system means a system in which two pulses are used to null out effects of the transmission medium on properties of the pulse in which information is encoded. Bethune et al. column 4 lines 25 to 35 disclose an autocompensating QKD system.

Reference herein to numbers of photons per pulse means the average number of photons per pulse unless context indicates otherwise, such as by the use of the word actual to characterize a pulse.

A single photon pulse as used herein has the same meaning ascribed to it at Bethune et al. column 5 line 61 to column 6 line 5, which pulses that each contain no more than one, and on average significantly less than one photon present in each pulse.

A multi photon pulse as used herein means the average number of photons in a set of pulses, in which each actual pulse may contain more than one photon, and in which set there are a significant fraction of the actual-pulses containing no more than one photon. In this context, the significant portion means enough pulses containing no more than one photon to ensure that a resulting QK is secure. Thus, the significant portion at the receiver may be for example any one of 1, 10, 20, 30, 40, 50, 60, 70, 80, or 90 percent, depending upon the algorithm used to remove errors from the final QK, the error rate, and the number of qubits of information actually transmitted from the sender.

QKD systems may result in two parties using the system having similar but not identical sets of key values, such as digital values, or sets if bits, for each of their QKs.

Error as used herein refers to those bits for which the QK of the two parties have different values.

The present inventor recognized that security can be guaranteed by using the novel procedures for QK error detection, correction, and privacy amplification disclosed herein.

SUMMARY OF THE INVENTION

It is an object of the invention to provide a secure communications system.

It is an object of the invention to provide unconditionally secure communications guaranteed by the laws of quantum mechanics.

It is another object of the invention to reduce or eliminate error in QKs.

It is another object of the invention to provide QKs derived from transmissions in which the initial error rate is relatively high.

These and other objects of the invention are provided by systems and methods for transmitting information in a 2 dimensional quantum system between two parties, each party interpreting the information as qubits in a mathematical representation of that system, and systems and methods for each party to determine from that information the same QK.

In one aspect, the invention comprises a system and method for QKD, comprising determining initial QKs, initial QKA and initial QKB; determining an initial QKA value of a first function applied to said initial QKA, wherein a value of said first function depends upon values of specified information unit of a QK, including bit i; determining an initial QKB value of said first function applied to said initial QKB; and forming a revised QKA by depending a value of an information unit of said revised QKA on a value of information unit i of said initial QKA, if said initial QKA value equals said initial QKB value.

In another aspect, the invention comprises a system and method for QKD, comprising determining initial QKs, initial QKA and initial QKB, initial QKA and initial QKB, each initial QK consisting of a series of information units, each information unit of each QK having one value of a set of defined values; performing on said initial QKA a third function to generate a QKA third function value; performing on said initial QKB said third function to generate a QKB third function value; wherein (1) said third function depends upon values of at least two bits of a QK and (2) said third function has only one of said defined values; and forming a revised QKA by setting a value of a bit of said revised QKA equal to said QKA third function value.

In another aspect, the invention comprises a system and method for QKD, comprising computing a value $X=u+QKA$, wherein u is a code word in a first code, and QKA is a QK; computing a value of $Y=X+QKB$, where QKB is a QK; and determining to which code word in said first code the value of Y is closest.

DETAILED DESCRIPTION OF THE PREFERRED EMBODIMENTS

Figures 1, 2:
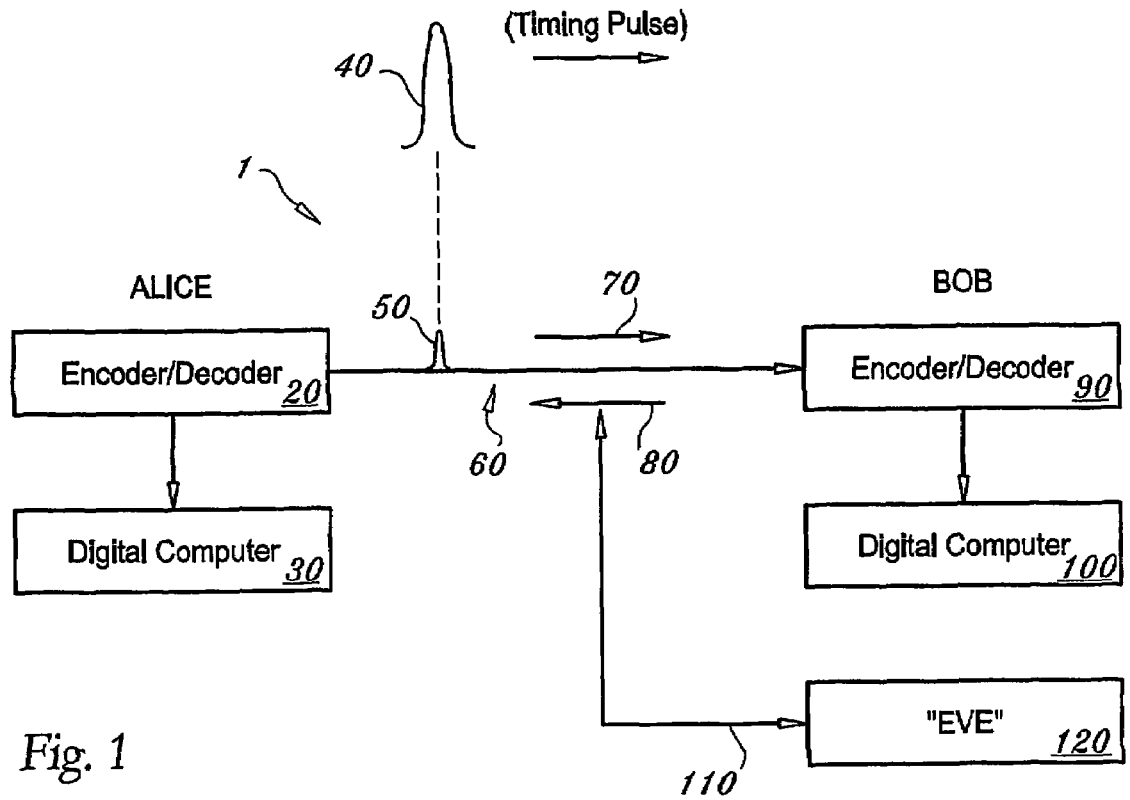
FIG. 1 is a schematic of a QK portion of a transmission system of the invention.
FIG. 2 is a schematic of QK data structures of the transmitter, receiver, and a potential eavesdropper.

FIG. 1 shows a QKD system 1. It is conventional to refer to sender and receiver in QKD as "Alice" and "Bob," and to a potential eavesdropper as "Eve," as shown in FIG. 1. System 1 includes Alice's encoder/decoder 20, digital computer 30, transmission medium 60, Bob's encoder/decoder 90, and digital computer 100. The potential for Eve to attempt to intercept and decode the QK is schematically illustrated by receiver 110 connected to decoder or encoder/decoder and digital computer 120.

In operation, Alice transmits a sequence of relatively high power timing pulses 40 that are time sequenced to relatively low power information pulses 50. Both pulses travel through the same transmission medium, medium 60. Transmission medium 60 may be a wave guide such as a single or multi mode, polarization preserving or polarization non preserving optical fiber, a far infrared or microwave waveguide, or free space (i.e., air or vacuum). Information pulses 50 are each electromagnetic energy having a wavelength preferably at near IR, far IR, microwave, or radio wave frequency. Each timing pulse 40 is either delayed or advanced by a predetermined interval from information pulse 50 such that encoder decoder 90 a priori knows when to expect to receive corresponding information pulse 50. Arrows 70 indicates information pulses propagating from Alice to Bob. Arrow 80 indicates information pulses 50 propagating from Bob to Alice. In some QKD system embodiments, such as the QKD system disclosed in U.S. Pat. No. 5,307,410 to Bennett, information pulses 50 are only transmitted by Alice and received by Bob. In some QKD system embodiments, such as the QKD system disclosed in U.S. Pat. No. 6,188,768 to Bethume et al., information pulses 50 are only transmitted by Alice received by Bob, modified by Bob, and transmitted back to Alice. In these Bethume et al. system, both Alice and Bob have an encoder and a decoder. However, Bennett's QKD system only requires that Alice have an encoder and that Bob have a decoder.

Digital computers 30, 100 are computers that process digital data (which can include representation of information units). Preferably, digital computers include a semiconductor CPU for processing parallel sequences of digital values, associated memory for storing instructions and processed data, such as magnetic disk media and random access memory, input output devices such as a cathode ray tube, a key boards, a mouse, voice command devices, etc. Alternatively, digital computers 30, 100 may be quantum computers in which data is either stored or processed by a quantum mechanical system having state values that can be determined and changed by external signals.

Digital computer 120 may be a quantum computer. Eve may perform the most general type of eavesdropping attacks allowed by quantum mechanics. The present invention guarantees unconditional security based on fundamental laws of quantum mechanics.

In QKD, for each quantum signal, each of Alice and Bob may choose randomly among a plurality of bases to perform encoding and decoding. Signals that are encoded in one basis, but decoded in another basis generally contain a lot of noises. We assume that, after their quantum signal transmission and measurements, Alice and Bob broadcast their bases. They discard all signals that are encoded in one basis, but decoded in a different basis. In other words, we assume that Alice and Bob only keep the signals that are encoded and decoded in the same basis.

FIG. 2 illustrates a part of a sequence of the QK data streams 200 for purposes of explanation of the digital data obtained by Alice, Bob, and Eve. Assume that Alice transmits information pulses 50 to Bob. Assume Alice transmits a QK, QKA 220 and Bob receives QKB 230.

The preferred embodiment discussed below computes digital values. A bit is defined herein to be a digital value of either one or zero. However, the invention is applicable to information represented in higher order bases than base 2, such as base 3, base 4, etc.

Information units is defined herein to mean numerical information represented in any base, such a bits, trots (which have values of 0,1, or 2), etc., and to continuous variables.

Alternatively to the bits used in the preferred embodiment, the method of the invention may represent data and process data represented in any information unit. Hence, each bit of the QK discussed below could be replaced by an information unit in any base or a continuous variable's value.

Alice encodes or bit stream 210 with one bit of QKA in each sequential information pulse 50 and transmits that sequence of information pulses 50 to Bob. If all actual information pulses 50 contained at least one photon, if perfect transmission occurred, if perfect reception occurred, and if Bob decoded using the same basis as Alice transmitted, then Bob's receive and decoded QKB 230 would be identical to QKA 220. However, if the transmission medium was imperfect, if all actual information pulses did not contain at least one photon, or if Eve intercepted (via a measurement) information, then QKB 230 would not be equal to QKA 220, as is shown in FIG. 2.

In a QKD system, any measurement by Eve of the sequence of information pulses 50 changes the information contained in the sequence of information pulses, thereby affecting QKB.

As shown in FIG. 2, QKB 230 substantially equals QKA, with a relatively small fraction of the same bits in QKB 230 and QKA 220 being different from one another. In contrast, FIG. 2 shows that Eve has only a small fraction of bits equal to the same bits in QKA 220. Generally, as the correlation between QKA 220 and Eve's bit stream 240 increases, the correlation between QKA 220 and QKB 230 decreases. Hence, a correlation between bit sequences 220 and 230 is an indication of security.

For a fixed correlation between QKA 220 and QKB 230, the amount of information that Eve may have on the raw bits in QKA 220 depends on the fraction of multi-photon signals that is received by Bob. The higher the fraction of multi-photon signals, the more information Eve can obtain on QKA 220 at any correlation between QKA 220 and QKB 230. This is because Eve can tap into signals that are multi-photons without introducing any errors. For simplicity, in the preferable embodiment, we will consider the case when the fraction of multi-photon is exactly zero. However, the invention applies to the general case, provided that the fraction of multi-photon is not unity. That is to say, at least some of the signals are actual single photon signals.

Figure 3:
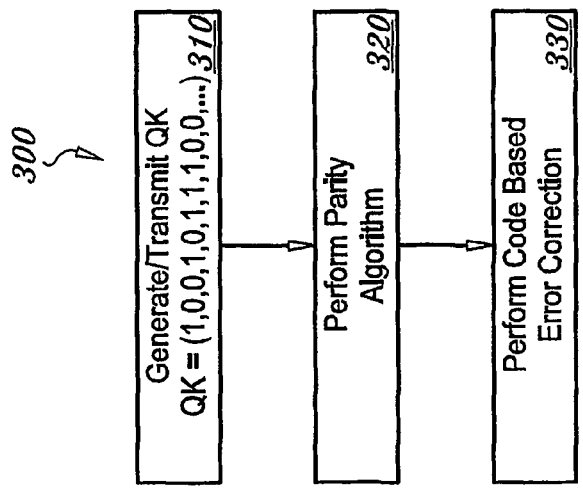
FIG. 3 is a high level flow chart of a method of the invention.

FIG. 3 is a high level flow chart of a method 300 of the invention.

In step 310, QKA is generated and transmitted to a receiver. QKA may be generated by a pseudo random number generator of digital computer 30, or, preferably, by a physical random number generator depending upon measurement of a state of a quantum mechanical system. Encoder/decoders for QKs are well known in the art, and are shown in the Bennett and Bethume et al. patents noted above. The receiver decodes QKB.

The sequence of bits (or information units) of QKA and QKB are maintained in the same order throughout the processing steps of the method of this invention. Thus, corresponding bits (or information units) of QKA and QKB, or functions of such bits (or information units), define ordered pairs.

In step 320, digital computers 30, 100 perform an algorithm on each of QKA and QKB, preferably a parity algorithm.

In step 330, digital computers 30 and 100 perform a code based error correction algorithm.

Portions of step 320 is optional. All of step 330 is optional. These two steps are discussed in more detail below.

Figure 4:
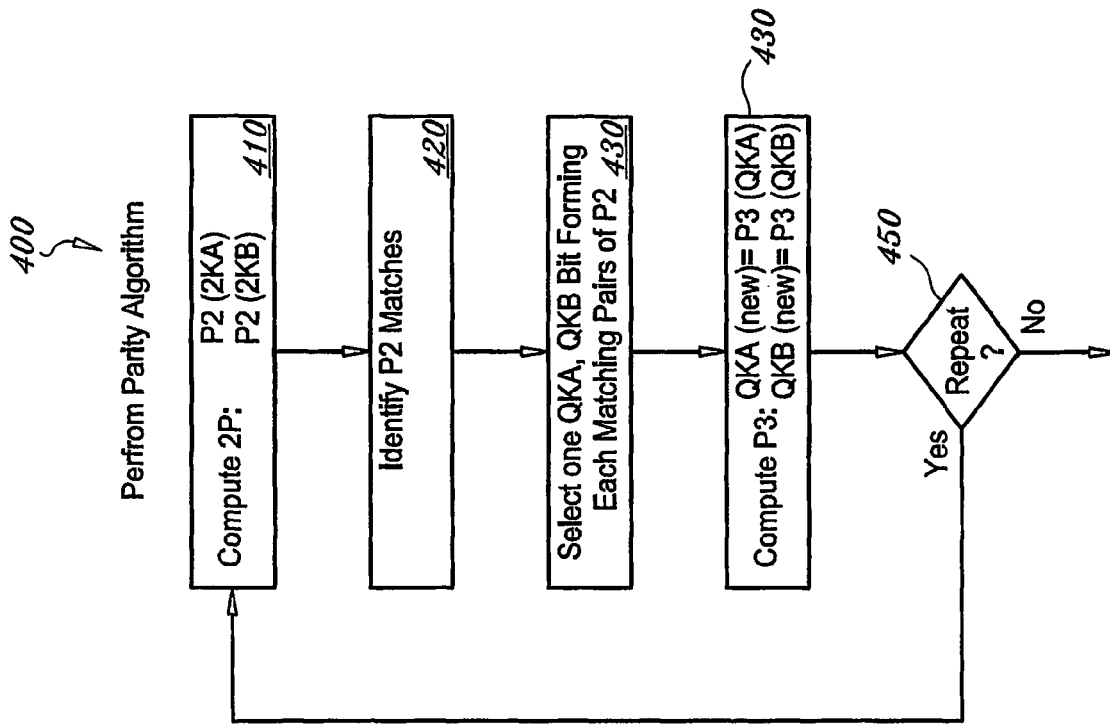
FIG. 4 is a medium level flow chart of step 320 of FIG. 3.

FIG. 4 shows an expanded view 400 of step 320 of FIG. 3.

In step 410, digital computer 30 computes at least P2(QKA) and digital computer 100 computes at least P2(QKB). P2 is a function whose value depends upon at least two bits (or information units) of a QK. In a preferred embodiment P2 can be represented a parity function such that P2(QKA)=mod2{[P2]·QKA} where the [P2] represents a digital (or information unit) sequence, "·" indicates that each bit of [P2] is multiplied by each corresponding bit of QKA, and mod2{} indicates the modulo base 2 function, thereby resulting in a value of one or zero. (The mod2 function may be replaced by a mod3, mod4, etc. Function when data is represented in higher order bases.) In order for [P2] to operate on at least two bits of a QK, [P2] must have at least two bits with non-zero values. However, P2 may be any function that operates on at least two bits (or information units) of a QK such that a value of P2(QK) depends upon values of at least two bits (or information units) of the QK, and is operative upon QKs with the number of bits included in QKA, QKB. Preferably, P2 is a function of only two, three, four, five bits (or information units) of a QK.

Preferably, in step 410, digital computers 30 performs a sequence of computations, P2k(QKA) for k=1 to n, wherein each P2k is a function having the properties just discussed for function P2. However, preferably, each P2k is a function of at least one different bit of the QK than any other P2k. More preferably, each P2k is a function of distinct bits of the QK than any other P2k. Thus, n is preferably such that substantially all bits of the QK are operated upon by at least one of the P2k. For example, if each P2i operates on 3 bits of the QK, and there are 300 bits in the QK, then n would be 100.

In step 420, digital computers 30, 100 communicate to identify those k's where P2k(QKA)=P2k(QKB).

In step 430, digital computers 30, 100 derive new digital sequences, or QKs, that depend upon the identifications in step 420. Specifically, digital computers identify that, for a specified k, such as k' where the ordered pair (P2k'(QKA), P2k' (QKB)) satisfies some prescribed relationship, digital computers 30, 100 both select a bit (or information unit) in their initial QK of which the P2k' depends, and then depend a value of their new QKs upon the value of that bit (or information unit). For example, if P2k' depends upon bit i of a QK, then digital computer 30 includes the value of bit i of QKA in its new QKA, and digital computer 100 includes the value of bit i of QKB in its new QKB. Preferably, digital computers 30, 100, perform this operation for each P2k identified in step 420. Thus, digital computers 30, 100 generate a new QKA, QKB, respectively. The new QKA and QKB include at least one, but could include 2, 3, or any number of bits derived from those P2k where P2k(QKA)=P2k(QKB). Moreover, digital computers 30, 100 position the bits (or information units) of the new QKs derived from the P2k where P2k(QKA)=P2k (QKB) in the same positions in the new QKA, QKB.

In step 440, digital computers 30, 100 compute PN(QKA), PN(QKB), respectively. Preferably, computers 30, 100 computer a set of functions PNk(QKA), PNk(QKB), where k=1 . . . p. PN, or each PNk is a function that depends upon at least two bits (or information units) of a QK, and PN, PNk have only values of either zero or one (or a number of values defined by the base of the information units). Digital computers 30, 100 each form a new QK by setting a value of a bit (or information units) of as new QKA, QKB, respectively, equal to a value of the PN function or each PNk function. Moreover, digital computers 30, 100 position the bit (or information unit) derived from the PN function or bits (or information units) derived from the PNk functions in the new QKA and QKB in the same sequence locations as one another. Preferably, digital computers 30, 100 perform PNk functions on substantially all of the bits (or information unit sequence positions) of QKA, QKB. In addition, p may be 1, 2, 10, 100 or any other number. Preferably, each PNk is a function of different bits or the pre-existing QKs, such that there are no more than ⅓ as many PNks as there are bits in the pre-existing QKs. Preferably, each PNk is a function of no more than three bits of the QKs. However, each PNk may be a function that depends upon 4, 5, 6, or any number of bits of the QKs.

In step 450, digital computers 30, 100 decide whether to repeat any of steps 410 to 430. The number of times to repeat any of these steps is predetermined. The factors that may enter into the predetermination are the number of transmitted bits in the QK, the initially determined fraction of P2 matches, the total number of such matches, or the number of transmitted bits (or information units) minus the number of P2 matches. In order to achieve a desired result, the number of repetitions of steps 410-440 increases with increasing error rate. Both digital computers perform the same number of repetitions.

Steps 410-430 constitute one algorithm. Step 440 constitutes another algorithm. Each of these two algorithms may be performed without performing the other one. Each of these two algorithms has independent utility in QKD.

Figure 5:
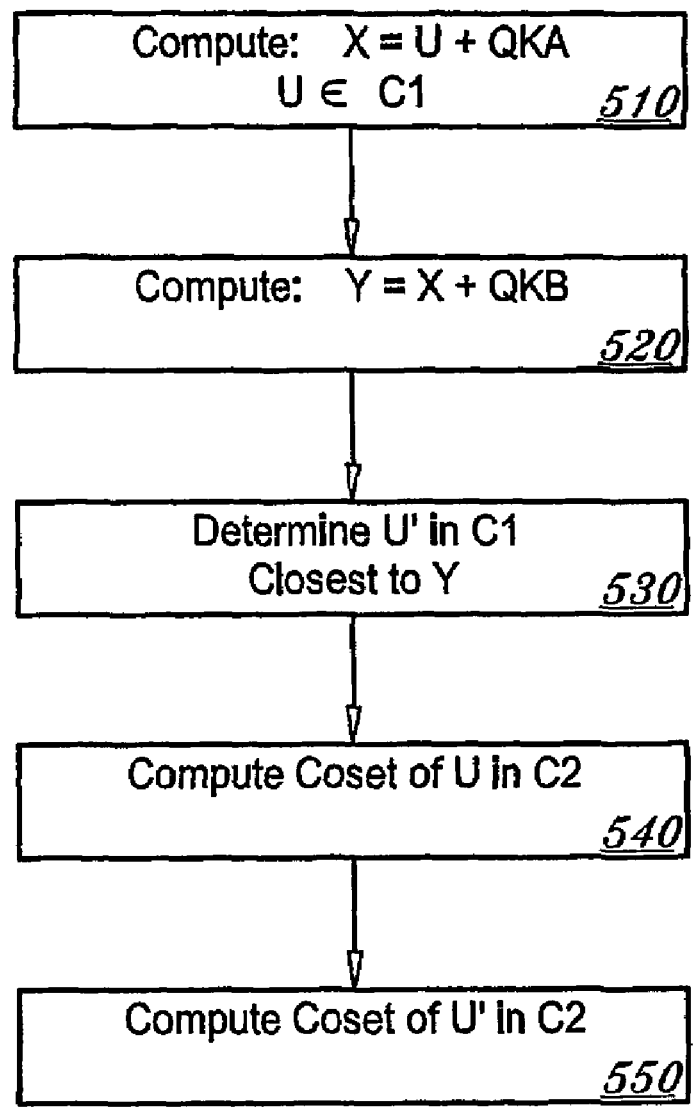
FIG. 5 is a medium level flow chart of step 330 of FIG. 3.

FIG. 5 shows an expanded view 500 of step 330 of FIG. 3.

In step 510, either digital computer 30 or digital computer 100 selects codes C1 and C2. Digital computer 30 computes a value X=u+QKA, wherein u is a code word in a predetermined code C1, and transmits X to digital computer 100.

In step 520, digital computer 100 computes a value of Y=X+QKB.

In step 530, digital computer 100 determines which the code word u' in C1 to which Y is closest in value. Here closeness is defined in terms of Hamming distance in classical coding theory.

In step 540, digital computer 30 selects a code C2 and computes the cosset of u in C2.

In step 550, digital computer 100 also selects code C2 and computes the cosset of u' in C2.

Assuming u=u', then the cosset of u in C2 is the same as the cosset of u' in C2. Alice and Bob may subsequently use the cosset of u in C2 to encode and decode their communications with one another.

Steps of FIG. 5 are similar to the steps 8 to 10 in Protocol 3 on page 4 of Short et al., "Simple Proof of Security of BB84 Quantum Key Distribution Protocol" Phys. Rev. Lett. 85 pp. 441-444 (2000) (herein "Short et al."), the teachings of which are hereby incorporated by reference. In Short et al., C1 and C2^\perp, the dual code of C2 are chosen such that they can correct the same fraction of errors. In contrast, in this aspect of this invention, we choose C1 and C2\perp to allow them to correct different fractions, f__1 and f__2, of errors. These different requirements indicate that the choice of C1 and C2, in the present invention is different from the choice made in the prior art scheme of Short et al.

F. J. MacWilliams and N. J. A. Sloane, "The Theory of Error-correcting codes," North-Holland, 1977 contains plenty of examples on how to choose codes that possess a given specific requirement in the error correcting capability. A possible choice of C1 is a BCH code. Given any specific fraction of errors that Alice and Bob would like to correct, the teaching of F. J. MacWilliams and N. J. A. Sloane, "The Theory of Error-correcting codes," North-Holland, 1977 tells one how to find such a BCH code. Preferably, we choose C1 to be an error correcting code based on a very sparse matrix. David MacKay "Good Error-correcting codes based on very sparse matrices," which is incorporated herein by reference, discusses suitable error correcting codes based on very sparse matrices.

This invention provides for selection of codes in view of the fraction of errors in the QK (i.e., differences between QKA and QKB) that the parties choose to correct. Correction fractions depend on the actual scheme and its operating parameter. For some prior art schemes such as BB84, disclosed in C. H. Bennett and G. Brassard, "Quantum Cryptography: Public Key distribution and Coin Tossing," in Proceedings of IEEE International Conference on Computers, Systems and Signal Processing, P. 175-179, IEEE, 1984, the correction fractions can be chosen to be over 11 percent, or over 16 percent.

Preferably, C2 is chosen to be a random sub code of C1. Indeed, as noted in Shor et al, "Simple Proof of Security of BB84 Quantum Key Distribution Protocol" (2001), with high probability, the dual code, C2^\perp, of a random sub code will be a good code. En the case that C2 is a random sub code of C1, the computation of the cosset of u is simple. Suppose u is a n-bit number. Represent u by a column vector. Generate a random r x n matrix M (i.e., a matrix of dimension r by n), with each of its rn entities being a random binary number (i.e., randomly chosen to be 0 or 1). The cosset of u in C2 is defined to be the r-bit number Mu. Mu is obtained by the matrix multiplication of M with u. In this case, the main difference of choice of codes aspects of the current invention from Shor et al. lies in our choice of the value of r. The value of r must satisfy the constraint r<k−n H (f__2), where H(f__2)=−f__2log__2f__2−(1−f__2)log__2(1−f__2), is the entropy function of the binary distribution with probabilities (f__2, 1−f__2) when C1 is an [n,k,d] code, which encodes k bits into n bits and can correct up to (d−1)/2 errors. For more details on this aspect of codes, see the publication by Hitoshi Inamori, Norbert LUtkenhaus, and Dominic Mayers "Unconditional Security of Practical Quantum Key Distribution," at URL http://xxx.lanl.gov/abs/quant-ph/0107017, and which is incorporated herein by reference.

Preferably, we choose the parameters in our invention to guarantee unconditional security of QKD against the most general attack by the eavesdropper, Eve. For the example for the perfect single photons (i.e., no multi-photon signals) and two bases case described in BB84 in C. H. Bennett and G. Brassard, "Quantum Cryptography: Public Key distribution and Coin Tossing," in Proceedings of IEEE International Conference on Computers, Systems and Signal Processing, P. 175-179, IEEE, 1984, the present invention provides a simple way of obtaining unconditional security and selecting acceptable operating parameters. Specifically, Alice and Bob pick a random sample of the bits that are transmitted and received in the same basis and compute their quantum bit error rate (QBER), p. We find it convenient to define ancillary variables, $(q\_x, q\_y, q\_z)$, and study their evolutions under the application of steps 410-430 and 440 and the values of $(q\_x, q\_y, q\_z)$ will tell us which path to go in Step 450 and what parameters to choose for the code-based error correction step in Step 330. For a sufficiently large random sample, we set the initial values of the ancillary variables $q\_x^{\{ini\}}=q\_z^{\{ini\}}=(p+\gamma)$, $q\_y=0$ where $\gamma>0$ is a small error term due to the fact that the size of random sample is finite.

Another example of QKD scheme that can be dealt with by our invention is the six-state QKD scheme by D. Bruss, Phys. Rev. Lett. 81, 3018 (1998). In this case, we set the initial values of the ancillary variables to be $q\_x^{\{int\}}=q\_y^{\{ini\}}=q\_z^{\{ini\}}=3\,p/2+\gamma$. When there are imperfections including non-perfect single-photon source in an experiment, one should first work out the corresponding values of $(q\_x, q\_y, q\_z)$ as a function of the various operating parameters (including correlations between QK in the various basis, fractions of multi-photons at the source, the amount of loss in the channel, detector inefficiencies and noises) of the experiment.

To illustrate the idea of the invention, we specialize to the case where the function P2k in Step 410 is an exclusive-OR between two bits. i.e., $P2k=(x\_i \oplus x\_j)$ (where the notation "\oplus" means addition modulo 2) of QK. Furthermore, a random pairing is performed between all the bits in QK. Step 420 is, indeed, the identify P2k operation which identifies the cases where P2k(QKA)=P2k (QKB). In this case, one round of the steps 410, 420, 430 taken together will map the ancillary variables to the following new values. See Gottesman-Lo revised version Eqs. (18)-(21), which is hereby incorporated by reference, and a copy of which is submitted herewith as appendix 1. Let us further specialize to the case where in Step 440 each PNk takes three bits as the input and outputs its parity, $(x\_i \oplus x\_j \oplus x\_k)$ modulo 2. Step 440 then maps the ancillary variables $(q\_x, q\_y, q\_z)$ from the end of step 430 to the new values given by: Gottesman-Lo revised version Eqs. (22)-(25). Equations 18-25 in Gottesman-Lo revised version are:

$$q'_x(\text{new})=(q^2_x=q^2_y)/p_s \quad (18)$$

$$q'_y(\text{new})=2q_x q_y/p_s \quad (19)$$

$$q'_z(\text{new})=2(1-q_x-q_y-q_z)*q_z p_s \quad (20)$$

$$p_s=1-2(_x-q_y)*(1-q_x-q_y) \quad (21)$$

$$q'_x(\text{new})=3q^2_1(q_x+q_y)+6q_1 q_x q_z+3q^2_x q_y+q^3_x \quad (22)$$

$$q'_y(\text{new})=6q_1 q_y q_z+3q_x(q^2_y+q^2_z)+3q_y q^2_z+q^3_y \quad (23)$$

$$q'_z(\text{new})=3q_1(q^2_y+q^2_z)+6q_x q_y q_z+3q^2_y q_z+q^3_z \quad (24)$$

$$q_1=1-q_x-q_y-q_z \quad (25)$$

Let us define two new ancillary values in terms of the old ones: $p\_x=q\_y+q\_z$ and $p\_z=q\_x+q\_y$. In Step 450, if there exists a $\delta>0$ (say 0.001) such that the inequality $H\_2(p\_x)+H\_2(p\_z)<1-\delta$ holds (where $H\_2(a)=-a \log\_2 a-(1-a) \log\_2(1-a)$ is the entropy function of the binary distribution with probabilities (a, 1−a)), then the algorithm will proceed to Step 330. Otherwise, Steps 410-440 should be repeated. Suppose the algorithm does proceed to Step 330. Then, an appropriate choice of the error correcting capability of the code C__1 is that it is highly likely to correct a fraction, $p\_$, of errors. An appropriate choice of the C__2\prep is that it is highly likely to correct another fraction, $p\_x$, of errors.

With above simple choice of the functions PZ and P3, above, the present invention applies to the prior art scheme BB84 and makes it unconditionally secure up to an error rate of about 17 percent bit error rates, whereas Shor et al only established the security of BB84 up to 11 percent. In contrast, error rates higher than 17 percent may be tolerated by other choices of algorithms in Steps 320 and 330.

While there has been described and illustrated a secure method and system for generating unconditionally secure keys from QKD, it will be apparent to those skilled in the art that modifications and variations are possible without deviating from the broad scope of the invention which shall be limited solely by the scope of the claims appended hereto.

We Claim:

1. A method of forming keys in a quantum key distribution (QKD) system, comprising:
    transmitting encoded qubits, based on single-photon light pulses, from a first encoder/decoder ("Alice") to a second encoder/decoder ("Bob) each respectively connected to respective Alice and Bob digital computers;
    from said transmitted encoded qubits, determining initial quantum keys QKA and QKB;
    determining an initial QKA value of a first function applied to said initial QKA, wherein a value of said first function depends upon values of a specified information unit i of a quantum key (QK);
    determining an initial QKB value of said first function applied to said initial QKB; and
    communicating between the Alice and Bob digital computers information about initial keys QKA and QKB so as to enable the formation of a revised QKA by depending a value of an information unit of said revised QKA on a value of said information unit i of said initial QKA, if said initial QKA value equals said initial QKB value.

2. The method of claim 1 wherein said information unit is a continuous variable.

3. The method of claim 1 wherein said information unit is a discrete variable.

4. The method of claim 1 wherein said information unit is a digital bit value.

5. The method of claim 1 wherein said first function depends upon at least two information units of a QK.

6. The method of claim 1 further comprising forming a revised QKB by depending a value of a bit of said revised QKB on a value of bit i of said initial QKB, if said initial QKA value equals said initial QKB value.

7. The method of claim 1 wherein said revised QKA includes a smaller number of bits than said initial QKA.

8. The method of claim 1 further comprising forming said revised QKA not depending upon a value of bit i of said initial QKA if said initial QKA value does not equal said initial QKB value.

9. The method of claim 1 further comprising determining a second function initial QKA value of a second function applied to said initial QKA, wherein a value of said second function depends upon values of specified bits of a QK, including bit j, j not equal to i; determining a second function initial QKB value of said second function applied to said initial QKB; and forming said revised QKA by depending a value of a bit of said revised QKA on a value of bit j of said initial QKA, if said second function initial QKA value equals said second function initial QKB value. second function initial QKB value.

10. The method of claim 1, further comprising: selecting a fraction of errors between said initial QKA and said initial QKB to be corrected; depending a dimension of a first code upon said percentage; and approximating a revised QKB using said first code.

11. The method of claim 10 further comprising applying a second code based upon function of a word in said first code and a second code to define a final code.

12. The method of claim 1 wherein a fraction of errors between QKA and QKB that is corrected is greater than 11 percent.

13. A quantum key distribution system for forming quantum keys, comprising:
    means for transmitting single photons between Alice and Bob encoder/decoder stations so as to form initial quantum keys QKA and QKB at the Alice and Bob encoder/decoder stations, respectively;
    computer-based means for determining an initial QKA value of a first function applied to said initial QKA, wherein a value of said first function depends upon values of specified information unit of a QK, including a bit i;
    computer-based means for determining an initial QKB value of said first function applied to said initial QKB;
    computer-based means for forming a revised QKA by depending a value of an information unit of said revised QKA on a value of information unit i of said initial QKA; and
    computer-based means for depending said means for forming said revised QKA based on whether said initial QKA value equals said initial QKB value.

14. A method of forming quantum keys in a quantum key distribution (QKD) system, comprising:
    transmitting single photons between Alice and Bob encoder/decoder stations so as to form initial quantum keys QKA and QKB at the Alice and Bob encoder/decoder stations, respectively
    wherein QKA and QKB each consist of a series of information units, each information unit of each of QKA and QKB having one value of a set of defined values;
    performing on said initial QKA via computer a third function to generate a QKA third function value;
    performing on said initial QKB via computer said third function to generate a QKB third function value;
    wherein: (1) said third function depends upon values of at least two bits of a quantum key and (2) said third function has only one of said defined values; and
    forming a revised QKA by setting a value of a bit of said revised QKA equal to said QKA third function value.

15. The method of claim 14 wherein said set of defined values are continuous real numbers.

16. The method of claim 14 wherein said set of defined values are a finite set of discrete values.

17. The method of claim 14 wherein said set of defined values are digital bit values.

18. The method of claim 14 wherein said third function depends upon at least two information units of a quantum key.

19. The method of claim 14 further comprising forming a revised QKA by setting a value of an information unit of said revised QKA equal to said QKA third function value.

20. The method of claim 14 further comprising:
    performing on said initial QKA a fourth function to generate a QKA fourth function value;
    performing on said initial QKB said fourth function to generate a QKB fourth function value;
    wherein: (1) said fourth function depends upon values of at least two bits of a quantum key and (2) said fourth function has only one of said defined values; and forming said revised QKA by setting a value of a bit of said revised QKA equal to said QKA fourth function value.

21. The method of claim 14 further comprising:
selecting a fraction of errors between said initial QKA and said initial QKB to be corrected, depending a dimension of a first code upon said fraction; and
approximating a revised QKB using said first code.

22. The method of claim 21 further comprising applying a second code based upon a function of a word in said first code and a second code to define a final code.

23. The method of claim 21 wherein said fraction is greater than 11 percent.

24. A quantum key distribution (QKD) system for forming quantum keys, comprising:
encoding/decoding means for performing an exchange of encoded single photons to establish, initial quantum keys QKA and QKB, each consisting of a series of information units, each information unit of each initial quantum key QKA and QKB having one value of a set of defined values;
computer-based means for performing on said initial QKA a third function to generate a QKA third function value;
computer-based means for performing on said initial QKB said third function to generate a QKB third function value;
wherein: (1) said third function depends upon values of at least two bits of a QK and (2) said third function has only one of said defined values; and means for forming a revised QKA by setting a value of a bit of said revised QKA equal to said QKA third function value.

25. A method of forming quantum keys in a quantum key distribution (QKD) system, comprising:
exchanging encoded single-photon light pulses between first and second encoding/decoding stations Alice and Bob to establish initial guantum keys QKA and QKB at Alice and Bob, respectively;
computing in a computer a value $X=u+QKA$, wherein u is a code word in a first code;
computing in a computer a value of $Y=X+QKB$; and determining to which code word in said first code the value of Y is closest.

26. The method of claim 25 further comprising:
selecting a fraction of errors between QKA and QKB to be corrected;
depending a dimension of said first code upon said percentage; and
approximating a revised QKB using said first code.

27. The method of claim 26 further comprising applying a second code based upon a function of a word in said first code and a second code, to define a final code.

28. The method of claim 26 wherein said fraction of errors between QKA and QKB is greater than 11 percent.

29. The method of claim 26 wherein said second code has a dual code, and wherein said first code and said second code are chosen so that said first code and said dual code correct different fractions of errors.

30. A system for forming quantum keys in a quantum key distribution (QKD) system, comprising:
encoding/decoding means for exchanging encoded single-photon light pulses between first and second encoding/decoding stations Alice and Bob to establish initial quantum keys QKA and QKB at Alice and Bob, respectively;
computer-based means for computing a value $X=u+QKA$, wherein u is a code word in a first code;
computer-based means for computing a value of $Y=X+QKB$; and
computer-based means for determining to which code word in said first code the value of Y is closest.

* * * * *